United States Patent [19]

Matsushita et al.

[11] Patent Number: 4,711,534
[45] Date of Patent: Dec. 8, 1987

[54] ZOOM LENS ABLE TO OBTAIN FOCAL LENGTHS BEYOND THE ZOOMING RANGE

[75] Inventors: Takashi Matsushita, Kanagawa; Sadatoshi Takahashi, Tokyo; Keiji Ikemori, Kanagawa; Nozomu Kitagishi, Tokyo; Tsunefumi Tanaka; Kikuo Momiyama, both of Kanagawa, all of Japan

[73] Assignee: Canon Kabushiki Kaisha, Tokyo, Japan

[21] Appl. No.: 705,567

[22] Filed: Feb. 26, 1985

[30] Foreign Application Priority Data

Feb. 27, 1984 [JP] Japan ................................ 59-35612

[51] Int. Cl.⁴ .......................... G02B 7/04; G02B 15/16
[52] U.S. Cl. .................................... 350/426; 350/428
[58] Field of Search ............................. 350/426, 428

[56] References Cited
U.S. PATENT DOCUMENTS 4,266,860 5/1981 Hayashi .............................. 350/426
4,465,343 8/1984 Horimoto ........................... 350/426

FOREIGN PATENT DOCUMENTS 2702059 6/1978 Fed. Rep. of Germany ...... 350/426

Primary Examiner—John K. Corbin
Assistant Examiner—Rebecca D. Gass
Attorney, Agent, or Firm—Toren, McGeady & Associates

[57] ABSTRACT

A zoom lens including, from front to rear, a first lens unit of negative power and a second lens unit of positive power with the separation therebetween being varied to effect zooming. The first lens unit is moved to effect focusing, wherein with the first lens unit focusing a finite object distance on the wide angle side, the second lens unit moves rearward to obtain focal lengths beyond the zooming range.

8 Claims, 18 Drawing Figures

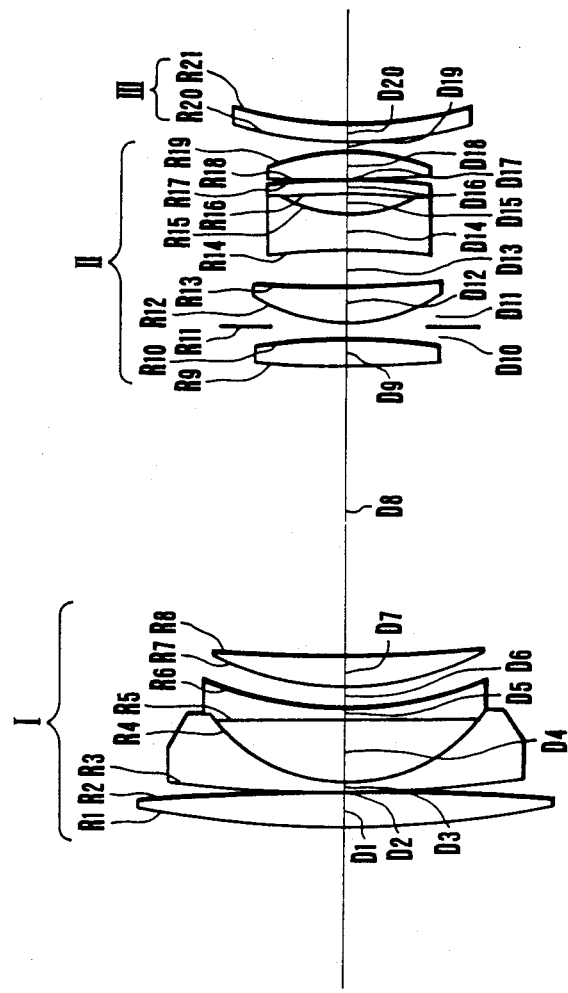

ZOOM LENS ABLE TO OBTAIN FOCAL LENGTHS BEYOND THE ZOOMING RANGE

BACKGROUND OF THE INVENTION

1. Field of the Invention

This invention relates to zoom lenses, and more particularly to high range zoom lenses suited for still cameras, cine cameras and video cameras.

2. Description of the Prior Art

Recently, for TV cameras and for ordinary cameras, there have been increasing demands for zoon lenses of extended ranges. The prior known methods of extending the variation range of the focal length are to increase the total movement of the variator, to strengthen the refractive power of the variator, and to increase the number of relatively movable lens units constituting the variator. However, these methods have drawbacks that when the total length of the lens system is increased, and the aberrational problem becomes difficult to solve. For example, Japanese Laid-Open Patent Application No. Sho 53-34539 discloses a zoom lens comprising, from front to rear, a first lens unit of negative refractive power and a second lens unit of positive refractive power with the separation therebetween being varied to affect zooming, or a so-called 2-component zoom lens, wherein the second lens unit is divided into three parts of positive, negative and positive refractive powers respectively of which the negative part is moved in differential relation to the positive parts, thus achieving an increase in the variation range of the focal length. This method, however, increases the diameter of the first lens unit. Otherwise, when the first lens unit is moved forward to adjustment the wide angle end, the oblique pencil from the close object point would be partly blocked. The total length of the lens also tends to increase.

FIG. 1 schematically illustrates a thin lens paraxial arrangement of the conventional 2-component zoom lens, where reference numeral identifies a first lens unit I of negative power, and II a second lens unit of positive power, moving in a way indicated by arrows between wide angle and telephoto ends W and T respectively of the zooming range. To extend the range, the total movement of each of the two lens units I and II may be increased as shown by dashed lines. The increase in the total movement, however, calls for an increase in the length of the zoom lens not only in the longitudinal direction but also in the lateral direction, making it difficult to reduce the bulk and size of the lens.

FIG. 2 illustrates a dislocation of the skew ray to the image point at the maximum height occurring when the first lens unit I of the 2-component zoom lens is moved forward to focus down to shorter object distances. This diagram is depicted when a diaphragm which coincides with the principal plane of the second lens unit II for the purpose of simplicity. As is obvious from FIG. 2, the diameter of the first lens unit I is determined at the front terminal end of the focusing range, or the position shown by the dashed line, in the wide angle end of the zooming range, as in most zoom lens designs. That is, if this focusing method is adopted, a surplus clear aperture must be set in the front or first lens I unit.

On the other hand, U.S. Pat. No. 4,256,371 to the assignee of the invention discloses the principle of construction of a zoom lens of extended range by moving lens groups beyond the terminal ends of the total movement of the ordinary zooming range. The present invention is to achieve a much-desired increase in the variation range of the focal length by utilizing that principle of construction.

A first object of the invention is to provide a zoom lens of extended range.

A second object of the present invention is to extend the ordinary variation range of the focal length toward the wide angle side, and, particularly to the variation range of the focal length when the minimum value is already shorter, to further shorten the minimum value.

A third object is to achieve a much-desired increase in the variation range of the focal length without increasing the diameter of the front lens unit I, or despite further reduction in the diameter.

Other objects will become apparent from the following description of embodiments of the invention.

SUMMARY OF THE INVENTION

A zoom lens including first lens means of negative refractive power and second lens means of positive refractive power arranged on the image side of the first lens means, the axial separation between the first lens means and the second lens means being varied to vary the focal length of the entire system in a prescribed range, wherein to obtain shorter focal lengths than the shortest focal length of the range, when the wide angle side of the range is reached, the first lens means is adjusted in position to focus the zoom lens to an object at a finite distance, and then at least the second lens means is moved rearward.

BRIEF DESCRIPTION OF THE DRAWINGS

FIG. 10 is a longitudinal section view of another specific lens of numerical data 2.

DETAILED DESCRIPTION OF THE PREFERRED EMBODIMENTS

Figure 1:
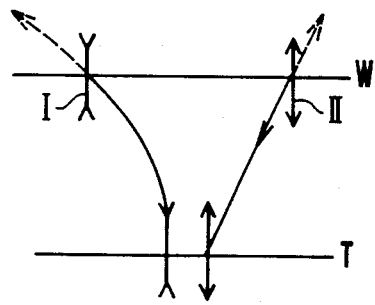
FIG. 1 is a schematic diagram illustrating motion of the conventional 2-component zoom lens expressed as a thin lens system during zooming.
Figure 2:
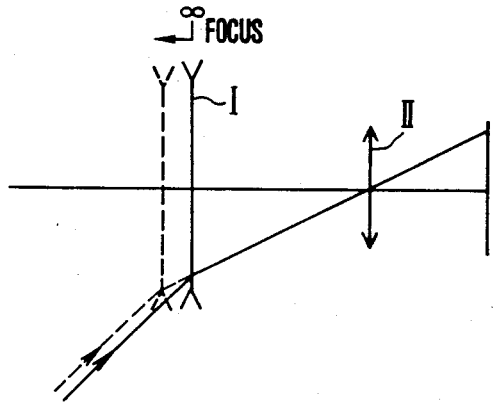
FIG. 2 is a schematic diagram illustrating a different focusing position of the lens system of FIG. 1 in the wide angle position.
Figure 3:
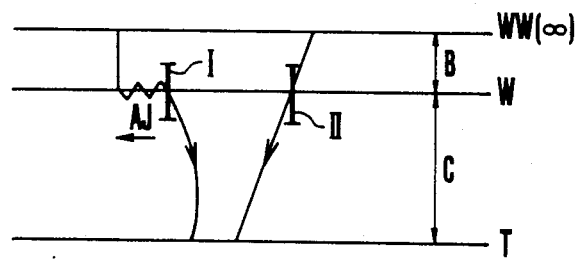
FIGS. 3, 4 and 5 are similar to FIG. 1 except that the three different methods of extending the range of the invention are illustrated associated with the different focusing methods.
Figure 4:
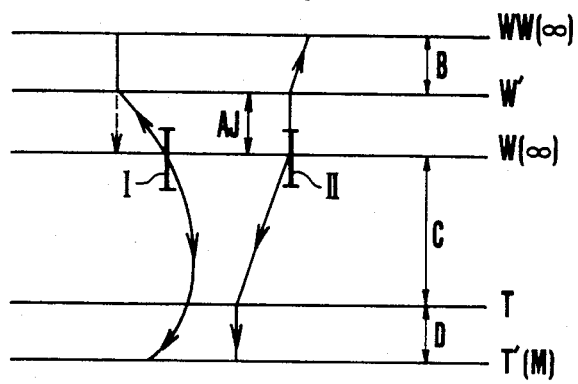
Figure 5:
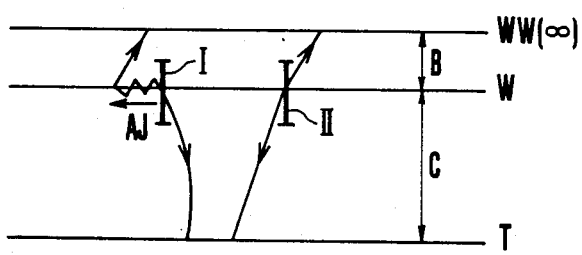

In FIGS. 3, 4 and 5, there are shown embodiments of thin zoom lens systems according to the present invention, where the negative first lens unit and the positive second lens unit constituting a 2-component type zoom lens are denoted by I and II respectively, the wide angle and the telephoto ends of a zooming range by W and T respectively, a super wide angle end to which the range of variation of the focal length is extended from the wide angle end W by WW, and an ordinary range and an extended range by C and B respectively.

In FIG. 3 from the wide angle end W of its total zooming movement (not always necessarily from the wide angle end W but, as case may be, from any zooming position near thereto), the first lens unit I is moved axially forward as indicated by an arrow AJ (adjustment) to focus down to shorter object distances.

Then to vary the focal length from the minimum value at the wide angle end W of the first zooming range C toward the further wider angle side in the second zooming range B, while the first lens unit I is held stationary, only the second lens unit II is axially moved rearward to the super wide angle end WW.

As this zooming goes on, the object on which the zoom lens is focusing changes its distance from the minimum value to, for example, infinity, or a finite value for pan-focusing. Where the focusing is set on an infinitely distant object, because the field depth is deeper in the extended zooming range, a sharp image of any other object in a wider range of distances from infinity can be obtained.

In FIG. 4, with the zoom lens in the wide angle side of the first range C, when focusing from an infinitely distant object to shorter distances, the first lens unit I is axially moved forward by using a camming slot contiguously elongated from the zoom control camming slot as the cam sleeve is turned by an angular distance AJ, while the second lens unit II is held stationary during focusing as a control camming slot is elongated in a direction perpendicular to the optical axis from the zoom control camming slot. Then, while the first lens unit I is held stationary, only the second lens unit II is moved rearward to extend the zooming range to the super wide angle end WW. Note, at this time, the focusing condition changes until an image of an infinitely distant object comes into sharp focus, similar to the zoom lens of FIG. 3.

In the telephoto end T of the first zooming range, on the other hand, as only the first lens unit I is axially moved forward in a range D of which the opposite terminal end is indicated at T', macro photography can be obtained.

FIG. 5 is similar to FIG. 3 except that not only the second lens unit II but also the first lens unit I moves axially rearward, either in differential relation or as a unit, to extend the zooming range to the super wide angle end WW. If both of the two lens units I and II are moved in the extended range, a further decrease of the minimum value of the extended range can be achieved. In addition thereto, the aberrations can be corrected easily.

As in the above, a zoom lens having an extended range toward the wider angle side is achieved. And, because variation of the focal length and focusing adjustment that follows the variation of the focal length are performed by moving the second lens unit II, the diameter of the front lens unit I can be minimized, as will be described below.

Figure 6:
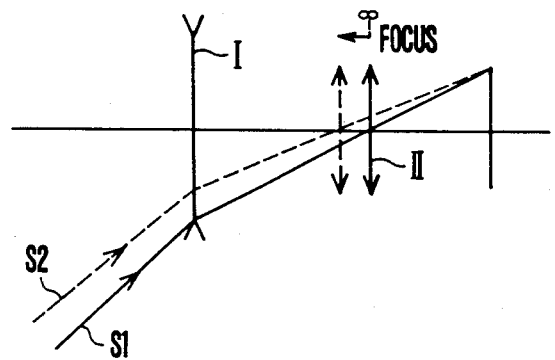
FIGS. 6 and 7 are diagrams of geometry explaining a dislocation of the skew ray which occurs when focusing in two different ways.
Figure 7:
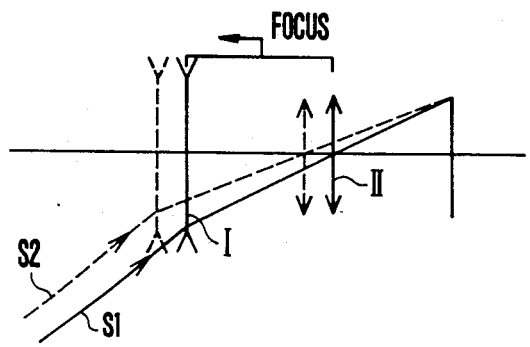
Figure 8:
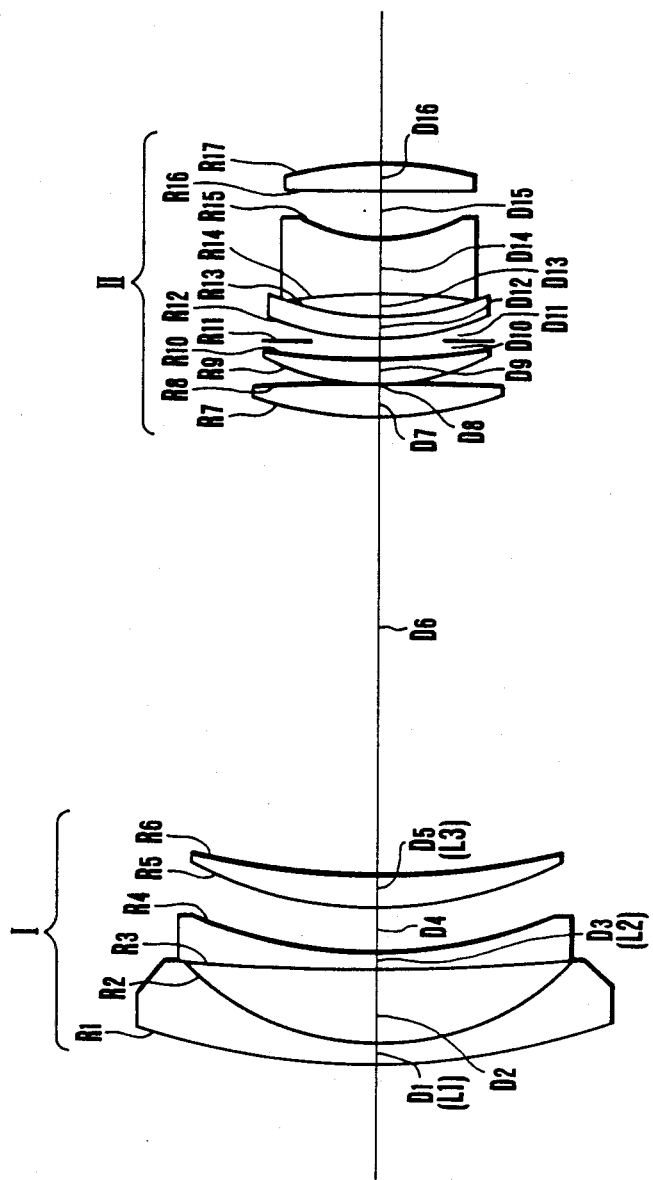
FIG. 8 is a longitudinal section view of a specific lens of numerical data 1.
Figure 9A:
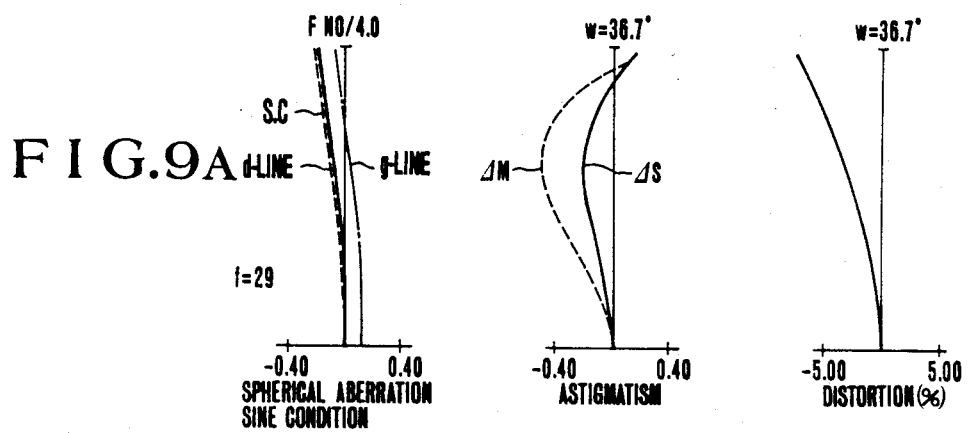
FIGS. 9A, 9B and 9C are graphic representations of the various aberrations of the lens of FIG. 8 in the wide angle, intermediate and telephoto positions respectively.
Figure 9B:
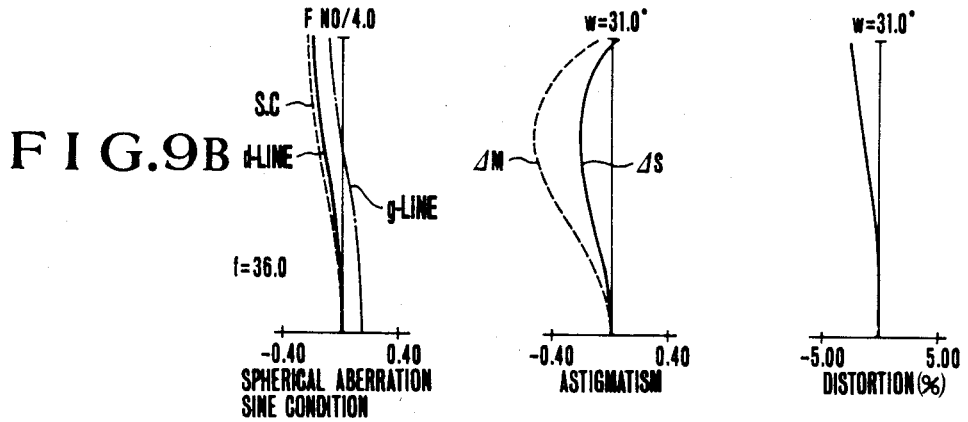
Figure 9C:
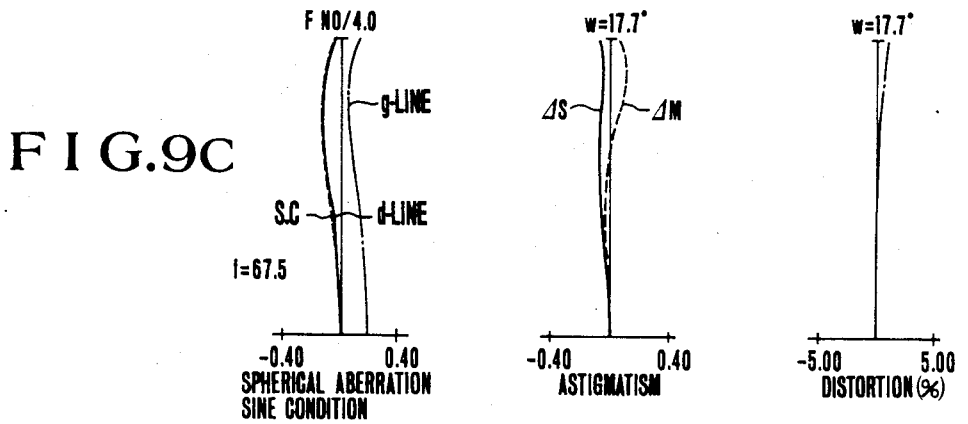
Figure 11A:
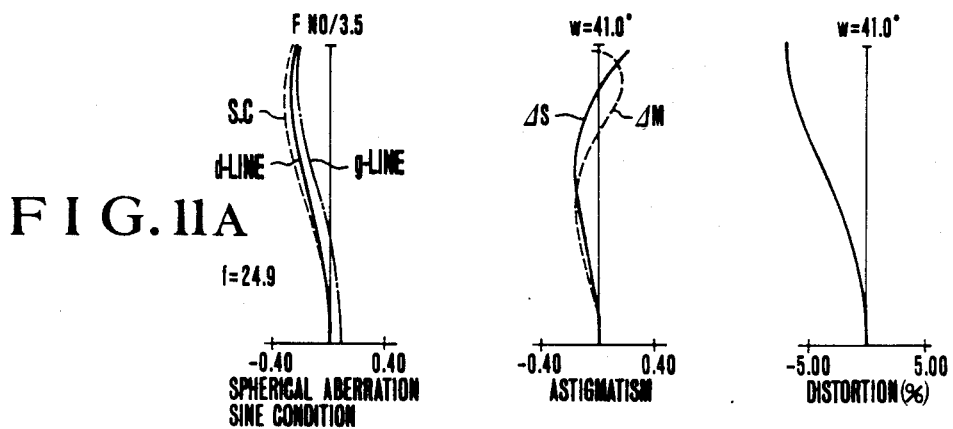
FIGS. 11A, 11B and 11C are graphic representations of the aberrations of the lens of FIG. 10 in the wide angle, intermediate and telephoto positions respectively.
Figure 11B:
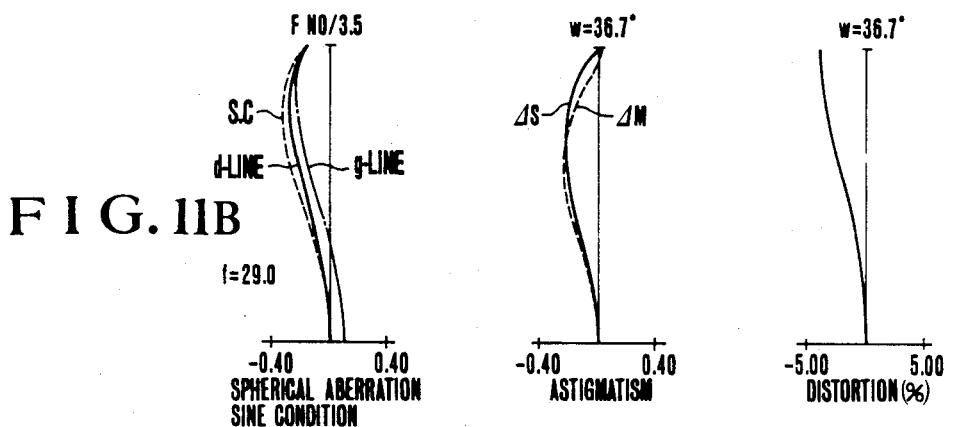
Figure 11C:
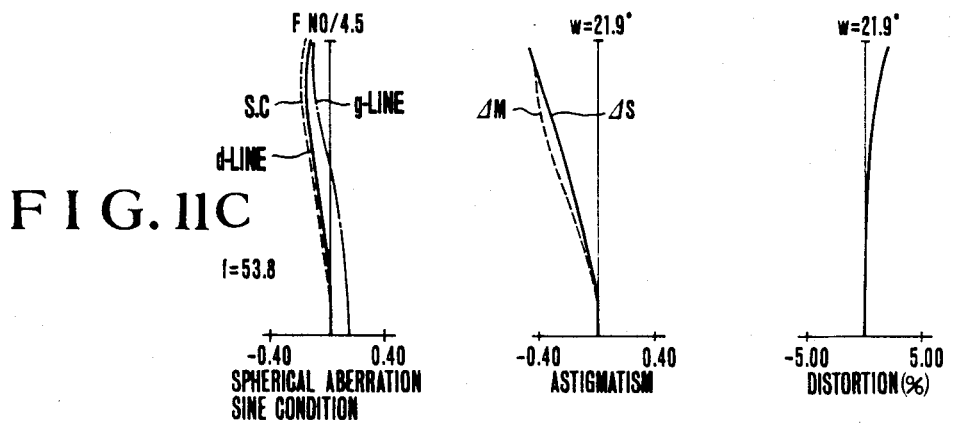

FIGS. 6 and 7 illustrate a change of the optical path of an off-axis principal ray S1, S2 when either the second lens unit II or both the first lens unit I and the second lens unit II is or are moved to vary the focal length and adjust focusing.

In FIG. 6, after the second lens unit II has been moved to zoom in the second range, when the object distance is changed, for example, from infinity to a minimum, the second lens unit II is moved to a position shown by a dashed line. By this, focusing can be adjusted to a given object though the focal length of the entire system changes. Since, at this time, the ray S1 is dislocated to the ray S2, the diameter of the front lens unit I is not required to increase, or rather, may be reduced. Therefore, it is possible to achieve minimization of the bulk and size of the zoom lens with ease.

FIG. 7 is similar to FIG. 6 except that the first and second lens units I and II are moved as a unit. In the embodiment of FIG. 7 too, for the entire focusing range, as focusing is performed from infinity, the clear aperture that admits the skew ray to the extra-axial image point is not increased in diameter similar to FIG. 6, but is decreased, facilitating a further minimization of the bulk and size of the zoom lens. Because the diameter of the front lens unit I is determined with an object at infinity, it is possible to prevent the diameter of the lens from increasing.

Through the zoom lens the present invention can achieve its aims, in order to achieve a further minimization of the bulk and size and improve of aberration correction, it is preferred to satisfy the following conditions:

$$fW < |f1| < fT \tag{1}$$

$$0 < IT < 0.2fW \tag{2}$$

$$1 < |\beta T| < 2 \tag{3}$$

$$0.5fW < fWW \leq fW \tag{4}$$

where fW, fT and fWW are focal lengths of the entire system in the wide angle end W, the telephoto end T and the super wide angle end WW of a zooming range, f1 is the focal length of the first lens unit I, IT is the axial separation between the first and second lens units I, II in the telephoto end T, and $\beta T$ is the magnification power of the second lens unit II in the telephoto end T of the zooming range.

Inequalities of condition (1) represent limits for the focal length of the first lens unit I. When the upper limit is exceeded, the total focusing movement in the wide angle end is increased and, in order to admit the ray to the extra-axial image point from the close object, the diameter of the front lens unit I must be increased. When the lower limit is exceeded, the refractive power of the front lens unit I becomes too strong to minimize the variation of the aberrations, particularly the spherical aberration, in the telephoto end T.

Inequalities of condition (2) represent limits for the axial separation between the first and second lens units I, II in the telephoto end T. When the upper limit is exceeded, a unnecessary space is formed in the telephoto end T, and is transformed to an increase in the axial separation between the first and second lens units I, II in the wide angle end W. To admit the ray to the extra-axial image point, therefore, the diameter of the front lens unit I has to be increased. This increases the length of the zoom lens in the longitudinal direction and also in the lateral direction, and adversely effects to the advance in compactness. When the lower limit is exceeded, the first and second lens units I, II suffer mechanical interference.

Inequalities of condition (3) define a range of magnification powers of the second lens unit II which functions mainly as a variator in the telephoto end T. Exceeding the upper limit means that the magnification power of the second lens unit II in the telephoto end T differs greatly from unity of magnification ($\beta V = -1$). Therefore, the variation of the aberrations by the second lens unit II is increased, and particularly greatly varies the spherical aberration in the telephoto end T. When the lower limit is exceeded, the total zooming movement of the second lens unit II is increased, and also the total zooming movement of the first lens unit I is increased. As a result, the axial separation between the first and second lens units I, II in the wide angle end W is increased. For the above-described reason, the diameter of the front lens unit I has to be increased.

Inequalities of condition (4) represent limits for the minimum focal length of the extended range from the wide angle end W to the super wide angle end WW. The upper limit represents the starting point of variation of the focal length of the wide angle end W of the invention. The lower limit represents a relationship of the focal lengths between the wide angle end W of the ordinary zooming range and the super wide angle end WW of the invention. To exceed this is to make it extremely difficult to admit the ray to the extra-axial image point in the super wide angle end WW with an object at infinity, and, therefore, to objectionably increase the diameter of the front lens unit I.

Though such conditions for each lens unit I, II, when satisfied, suffice for minimization of the bulk and size and improvement in the aberration correction, it is further preferred that the first lens unit I be constructed with three lenses of which the first two counting from the front are a meniscus-shaped lens L1 of negative refractive power with the convex curvature toward the front and a lens L2 of negative refractive power, and third is a lens L3 of positive refractive power with its front surface convex toward the front. By the lens L1, distortion in the wide angle side W is very well corrected. To particularly correct distortion in the super wide angle side WW, it is preferred to arrange a lens of positive refractive power with its front surface convex toward the front in front of the lens L1 lens.

The second lens unit II is preferably constructed with at least four lenses, or, from front to rear, a lens of positive refractive power, a meniscus-shaped lens of forward convexity, a lens of negative refractive power and a lens of positive refractiver power to achieve proper stability of aberration correction throughout the entire zooming range. In order to minimize variation of chromatic aberrations with zooming so that the chromatic aberrations are stable throughout the entire zooming range, and to adjust the Petzval sum to a proper value so that field curvature is properly corrected, the following conditions are satisfied:

$$N1N > 1.65 \tag{5}$$

$$N1P > 1.7 \tag{6}$$

$$\nu 1P < 30 \tag{7}$$

where N1N identifies a mean value of the refractive indices of the glasses of the lenses of negative power in the first lens unit I, and N1F and $\nu$1F respectively identify a refractive index and an Abbe number of the glass of the lens L3.

An inequality of condition (5) properly sets forth the Petzval sum. When the limit is exceeded, the field curvature becomes large. Inequalities of conditions (6) and (7) suppress variation of chromatic aberrations with zooming so that the chromatic aberrations are properly stabilized throughout the entire zooming range. When the conditions (6) and (7) are violated, proper stability of chromatic aberrations becomes difficult.

Figure 12:
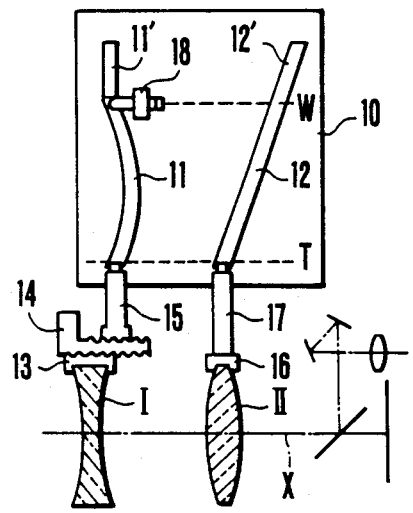
FIG. 12 is a schematic view of an operating mechanism for the zoom lens of FIG. 3.

FIG. 12 illustrates a mechanism for operating the optical system of FIG. 3. In the drawing, a cam sleeve 10 is depicted in the expanded form. Respectively zoom camming slots 11 and 12 have the portions W and T which are used for zooming. An extended portion 11' is extended from the camming slot 11 to such a direction that even though the cam sleeve 10 turns about an optical axis X, the lens does not move. Also an extended portion 12' is provided and extends from the camming slot 12.

A holding sleeve 13 for the lens I screw-threadedly engages a focusing sleeve 14 which is in turn screw-threadedly engaged with a first driver 15. When the focusing sleeve 14 is turned about the optical axis, the holding sleeve 13 moves axially. The first driver 15, while being guided by the camming slot 11, moves the lens I axially to effect zooming.

A holding sleeve 16 for the lens II is connected to a second driver 17. The second driver 17 while being guided by the camming slot 12, moves the lens II axially to effect zooming.

A latching device 18 prevents the first and second drivers 15 and 17 from unintentionally advancing into the extended portions 11' and 12' of the camming slots 11 and 12. When a bar of the latching device 18 is retracted, the first drive 15 is allowed to enter the extended portion 11' of the camming slot 11.

Figure 13:
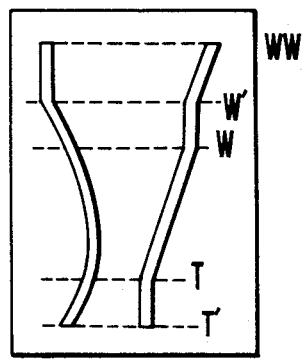
FIG. 13 is an expanded view of a control cam sleeve for the zoom lens of FIG. 4.

FIG. 13 is an expanded view which illustrates a cam sleeve for achieving the embodiment shown in FIG. 4. Engaged in each of the camming slots 11, 12 is the driver 15, 17 for moving the lens.

Next, the numerical data of the invention are shown. In the numerical data, Ri identifies a radius of curvature of the i-th lens surface counting from the front, Di identifies an i-th lens thickness or air separation counting from the front, and Ni and $\nu$i respectively identify a refractive index and an Abbe number of the glass of the i-th lens element counting from the front.

The numerical data 1 (FIG. 8 and FIGS. 9A, 9B and 9C) have achieved a first range of variation of the focal length f=36–67.5 mm, and a second range of variation of the focal length f=29–36 mm. The zooming method of FIG. 3 or 4 is employed. In the zooming position of f=36 mm, when focusing down to an object distance of 384 mm, the first lens unit is moved forward from the position for an object at infinity by a distance 10.74 mm. Then, the first lens unit is held stationary, and the second lens unit is moved rearward by a distance of 4.82 mm to extend the range of f=29 mm with an object at infinity. And, at this time, when to focusing down to an finite object distance, the second lens unit may be moved forward.

The numerical data 2 (FIG. 10 and FIGS. 11A, 11B and 11C) give a zoom lens comprising three lens units, of which the third may be either stationary or moved during zooming. A first range of variation of the focal length f=29–53.8 mm, and a second range of variation of the focal length f=24.9 mm–29 mm have been achieved. The zooming method of FIG. 3 or 4 is employed. In a zooming position of the focal length f=29, when focusing down to an object distance of 396 mm, the first lens unit is moved forward from the position for an infinitely distance object by a distance of 4.5 mm. Then, the first lens unit is held stationary, and the second lens unit is moved rearward by a distance of 3.02 mm to extend the first range to f=24.9 mm with an object at infinity. When focusing down to a finite object distance, the second lens unit is moved forward. Also in the wide angle end, it is possible to make macro photography by moving the second lens unit forward.

As has been described above, according to the present invention, it is made possible to achieve a zoom lens of greatly extended range with the limitation of the bulk and size to a minimum while still permitting good stability of aberration correction.

Figure 14:
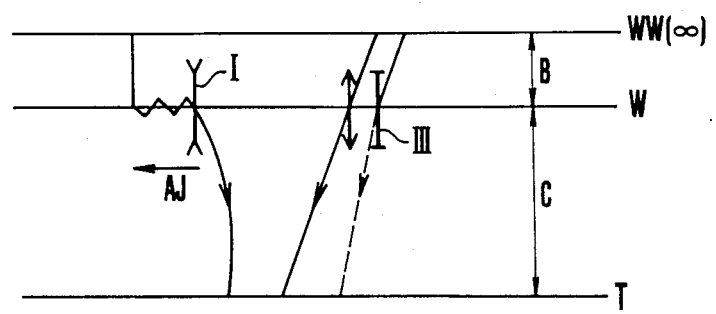
FIG. 14 is similar to FIG. 3 except that a modification example is illustrated.

Also in the present invention, if a third lens unit III is arranged in rear of the second lens unit II as shown in FIG. 14, or in front of the first lens unit to remain stationary or to move, during zooming, a further increase in the range of variation of the focal length can be achieved while maintaining good correction of aberrations. The third lens unit can take a positive or a negative refractive power.

Numerical Data 1
F = 29.0–67.5   FNO = 1:4   2ω = 71.4°–35.4°

| | | | |
|---|---|---|---|
| R1 = 67.81 | D1 = 1.90 | N1 = 1.77250 | ν1 = 49.6 |
| R2 = 25.98 | D2 = 7.81 | | |
| R3 = 188.33 | D3 = 1.70 | N2 = 1.77250 | ν2 = 49.6 |
| R4 = 49.35 | D4 = 4.69 | | |
| R5 = 37.81 | D5 = 3.30 | N3 = 1.75520 | ν3 = 27.5 |
| R6 = 83.50 | D6 = Variable | | |
| R7 = 39.66 | D7 = 3.13 | N4 = 1.69680 | ν4 = 55.5 |
| R8 = −226.90 | D8 = 0.10 | | |
| R9 = 26.77 | D9 = 2.47 | N5 = 1.64000 | ν5 = 60.1 |
| R10 = 118.54 | D10 = 1.70 | | |
| R11 = (stop) | D11 = 0.20 | | |
| R12 = 28.08 | D12 = 2.20 | N6 = 1.60311 | ν6 = 60.7 |
| R13 = 31.43 | D13 = 1.90 | | |
| R14 = −118.62 | D14 = 5.44 | N7 = 1.80518 | ν7 = 25.4 |
| R15 = 19.16 | D15 = 4.84 | | |
| R16 = 186.41 | D16 = 2.79 | N8 = 1.62588 | ν8 = 35.7 |
| R17 = −31.51 | | | |

| | f | | |
|---|---|---|---|
| | 29.0 | 36.0 | 67.5 |
| D6 | 45.74 | 30.18 | 0.11 |

| | | |
|---|---|---|
| f1 = −58.04 | f2 = 39.97 | |
| βW = −0.5 | βT = −1.16 | |

Numerical Data 2
F = 24.9–53.8   FNO = 1:3.5–4.5   2ω = 82.0°–43.8°

| | | | |
|---|---|---|---|
| R1 = 111.08 | D1 = 3.24 | N1 = 1.65844 | ν1 = 50.9 |
| R2 = 5320.68 | D2 = 0.20 | | |
| R3 = 132.92 | D3 = 1.43 | N2 = 1.80610 | ν2 = 40.9 |
| R4 = 18.53 | D4 = 5.78 | | |
| R5 = 212.85 | D5 = 1.28 | N3 = 1.80400 | ν3 = 46.6 |
| R6 = 35.68 | D6 = 2.16 | | |
| R7 = 28.29 | D7 = 3.49 | N4 = 1.80518 | ν4 = 25.4 |
| R8 = 108.31 | D8 = Variable | | |
| R9 = 69.68 | D9 = 2.63 | N5 = 1.60311 | ν5 = 60.7 |
| R10 = −63.73 | D10 = 1.46 | | |
| R11 = (stop) | D11 = 0.50 | | |
| R12 = 18.70 | D12 = 3.07 | N6 = 1.71300 | ν6 = 53.8 |
| R13 = 66.73 | D13 = 4.07 | | |
| R14 = −51.14 | D14 = 3.80 | N7 = 1.84666 | ν7 = 23.9 |
| R15 = 20.34 | D15 = 1.24 | | |
| R16 = 2204.17 | D16 = 1.67 | N8 = 1.62004 | ν8 = 36.3 |
| R17 = −76.95 | D17 = 0.20 | | |
| R18 = 114.31 | D18 = 2.72 | N9 = 1.62004 | ν9 = 36.3 |
| R19 = −22.68 | D19 = Variable | | |
| R20 = 43.03 | D20 = 1.50 | N10 = 1.48749 | ν10 = 70.1 |
| R21 = 33.37 | | | |

| | f | | |
|---|---|---|---|
| | 24.9 | 29.0 | 53.8 |
| D8 | 28.84 | 21.32 | 0.26 |
| D19 | 1.17 | 4.2 | 22.49 |

| | | |
|---|---|---|
| f1 = −38.48 | f2 = 31.26 | f3 = −321.31 |
| βW = −0.59 | βT = −1.27 | |

What is claimed is:

1. A zoom lens comprising first lens means of negative refractive power and second lens means of positive refractive power arranged on the image side of said first lens means, the axial separation between said first lens means and said second lens means being varied to vary the focal length of the entire system in a prescribed range, when the wide angle side of the range is reached, said first lens means is adjusted in position to focus the zoom lens to an object at a finite distance, and then at least said second lens means is moved rearward so as to expand the picture angle beyond the wide angle end of the zoom lens.

2. A zoom lens according to claim 1, wherein said second lens means is moved rearward while said first lens means is held stationary.

3. A zoom lens according to claim 1, wherein when said second lens means is moved rearward, said first lens means also is moved rearward simultaneously.

4. A zoom lens according to claim 1, wherein when said second lens means is moved rearward, the zoom lens is focused to infinity.

5. A zoom lens according to claim 1, further comprising:
focal third lens means on the image side of said second lens means.

6. A zoom lens according to claim 1, wherein said zoom lens satisfies the following conditions:

$fW < |f1| < fT$, $0 < IT < 0.2 fW$, $1 > |\beta T| < 2$, and $0.5 fW < fWW \leq fW$, where fW, fT and fWW are focal lengths of the zoom lens at a wide angle end, a telephoto end, respectively, of said zooming range, and a super wide angle position beyond the wide angle end, f1 is a focal length of said first lens means, IT is the axial separation between said first and said second lens means at the telephoto end of said zooming range, and βT is a magnification power of said second lens means of the telephoto end of said zooming range.

7. A zoom lens according to claim 1, wherein said zoom lens satisfies the following conditions:

$N1N > 1.65,$ $N1F > 1.7,$ and $v1F > 30,$ where N1N is a mean value of refractive indices of glasses of lenses of negative power in the first lens means, and N1F and v1F, are, respectively, a refractive index and an Abbe number, of the glass of a lens in the first lens means.

8. A zoom lens comprising:
first lens means having a negative refractive power;
second lens means having a refractive power of opposite sign to that of the refractive power of said first lens means and arranged on the image side of said first lens means;
zooming means for auxiliary moving said first lens means and said second lens means to effect zooming;
first moving means for axially moving said first lens means beyond a wide end of the zooming range to focus the zoom lens to shorter object distances; and
second moving means for moving said second lens means rearward from the wide end of the zooming range to extend the focal length of the zoom lens from the range of variation of the focal length with zooming.

* * * * *